(12) United States Patent
Lee et al.

(10) Patent No.: US 6,788,359 B2
(45) Date of Patent: Sep. 7, 2004

(54) METHOD FOR ILLUMINATING LIQUID CRYSTAL DISPLAY DEVICE, A BACK-LIGHT ASSEMBLY FOR PERFORMING THE SAME, AND A LIQUID CRYSTAL DISPLAY DEVICE USING THE SAME

(75) Inventors: Jeong-Hwan Lee, Gyeonggi-do (KR); Ik-Soo Lee, Suwon-si (KR); Kyu-Seok Kim, Yongin-si (KR); Jong-Ho Won, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 243 days.

(21) Appl. No.: 09/874,316

(22) Filed: Jun. 6, 2001

(65) Prior Publication Data

US 2001/0050736 A1 Dec. 13, 2001

(30) Foreign Application Priority Data

Jun. 7, 2000 (KR) ........................................ 2000-31056

(51) Int. Cl.[7] ............................................ G02F 1/1335
(52) U.S. Cl. .............................. 349/65; 369/61; 369/62; 369/63; 369/64; 369/65; 369/60; 369/69; 369/70
(58) Field of Search .............................. 369/60, 61, 62, 369/63, 64, 65, 58

(56) References Cited

U.S. PATENT DOCUMENTS 5,377,084 A * 12/1994 Kojima et al. ................ 362/31
5,777,804 A * 7/1998 Nakamura et al. ........... 359/727
5,798,805 A * 8/1998 Ooi et al. ...................... 349/10
6,023,277 A * 2/2000 Osaka et al. ................. 345/419
6,358,759 B1 * 3/2002 Hirabayashi .................... 438/7
6,452,649 B1 * 9/2002 Ono et al. ..................... 349/61

* cited by examiner

Primary Examiner—Nathan J. Flynn
Assistant Examiner—Fazli Erdem
(74) Attorney, Agent, or Firm—McGuireWoods LLP (57) ABSTRACT

A method for illuminating a liquid crystal display device, a back-light assembly for performing the same and a liquid crystal display device using the same can improve the front luminance and production yield. Lights from a lamp is incident to a LCD panel side, which are then primarily diffused for a uniformity of the luminous flux of the incident lights. The luminous flux of the primarily diffused lights is condensed with respect to a first orientation component on a plane in parallel with the LCD panel, and then partially and secondarily diffused for extending a view angle of pixels of the LCD panel. After the luminous flux of the secondarily diffused lights is condensed with respect to a second orientation component perpendicular to the first orientation on the parallel plane, the condensed lights are illuminated onto the LCD panel. A diffusion sheet for secondarily diffusing the luminous flux and a condensing sheet for condensing the second orientation component are formed by a single sheet to reduce the manufacturing process of the liquid crystal display device. Also, a defect produced from respective sheets is minimized to enhance the yield.

17 Claims, 9 Drawing Sheets

METHOD FOR ILLUMINATING LIQUID CRYSTAL DISPLAY DEVICE, A BACK-LIGHT ASSEMBLY FOR PERFORMING THE SAME, AND A LIQUID CRYSTAL DISPLAY DEVICE USING THE SAME

BACKGROUND OF THE INVENTION

1. Field of the Invention

The present invention relates to a method for illuminating in a liquid crystal display device, a back-light assembly for performing the same and a liquid crystal display device using the same, and more particularly, to a method for illuminating a liquid crystal display device and a liquid crystal display device using the same. The method for illuminating a liquid crystal display device enhances the front luminance of the liquid crystal display device, reduces the manufacturing process steps and renders a thin and light liquid crystal display device.

2. Description of the Related Art

Generally, a liquid crystal display device applies a voltage to a specific molecular arrangement of a liquid crystal to convert its molecular arrangement. Then, the liquid crystal display device converts the changes of the optical properties such as birefringence, optical linearity, dichroism and optical scattering characteristics of liquid crystal cells that emits light according to the molecular arrangement, and uses the modulation of the light of the liquid crystal cells.

The liquid crystal display device is largely sorted into a TN (Twisted Nematic) type and a STN (Super-Twisted Nematic) type. The liquid crystal display device is, according to the driving method, sorted into an active matrix display type, which uses a switching device and a TN liquid crystal, and a passive matrix type, which uses an STN liquid crystal.

A distinguishable difference of two types is that the active matrix display type is a TFT-LCD that drives an LCD by using a TFT and that the passive matrix display type does not have such a complicated circuit associated with a transistor because it has no transistor.

Since the liquid crystal display device is a passive light element incapable of emitting light itself, the images are displayed by using a back-light assembly attached to the rear plane of the liquid crystal panel.

Recently, there are several structures developed for contriving the slim and light products so as to have the leading edge of the competitiveness. Especially, the light-weight becomes a more important factor in view of the adoption chiefly to a portable computer, etc.

In such a liquid crystal display device, the role and function of the back-light assembly have been considered as increasingly important, because the dimension, light efficiency and so on differ depending on the back-light assembly structure to affect on overall mechanical/optical characteristics of the liquid crystal display device.

A structure of a general back-light assembly used in the liquid crystal display device is disclosed in U.S. Pat. No. 5,467,208.

Figure 1:
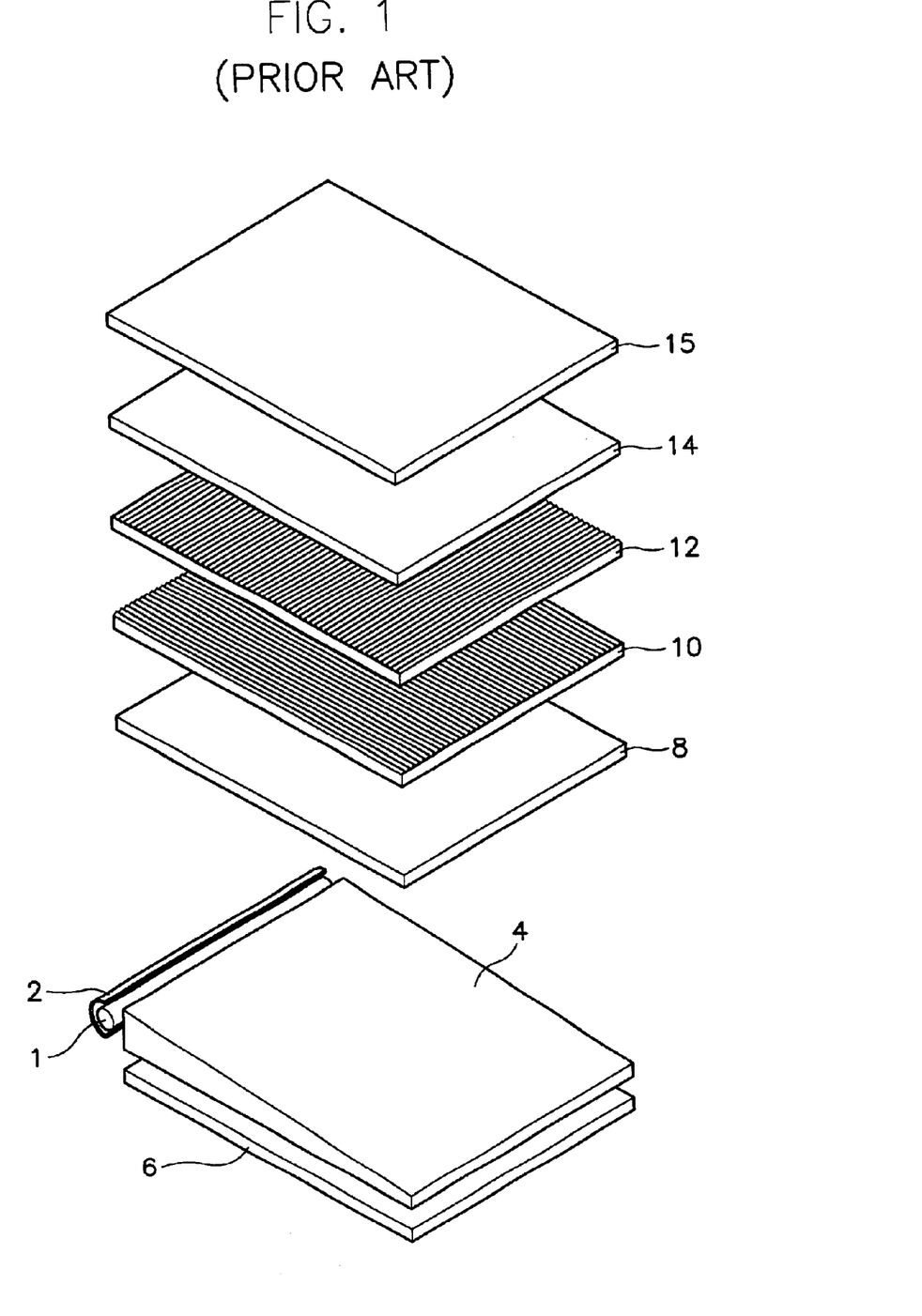
FIG. 1 is a perspective view schematically showing a back-light assembly of a conventional liquid crystal display device.
Figure 2:
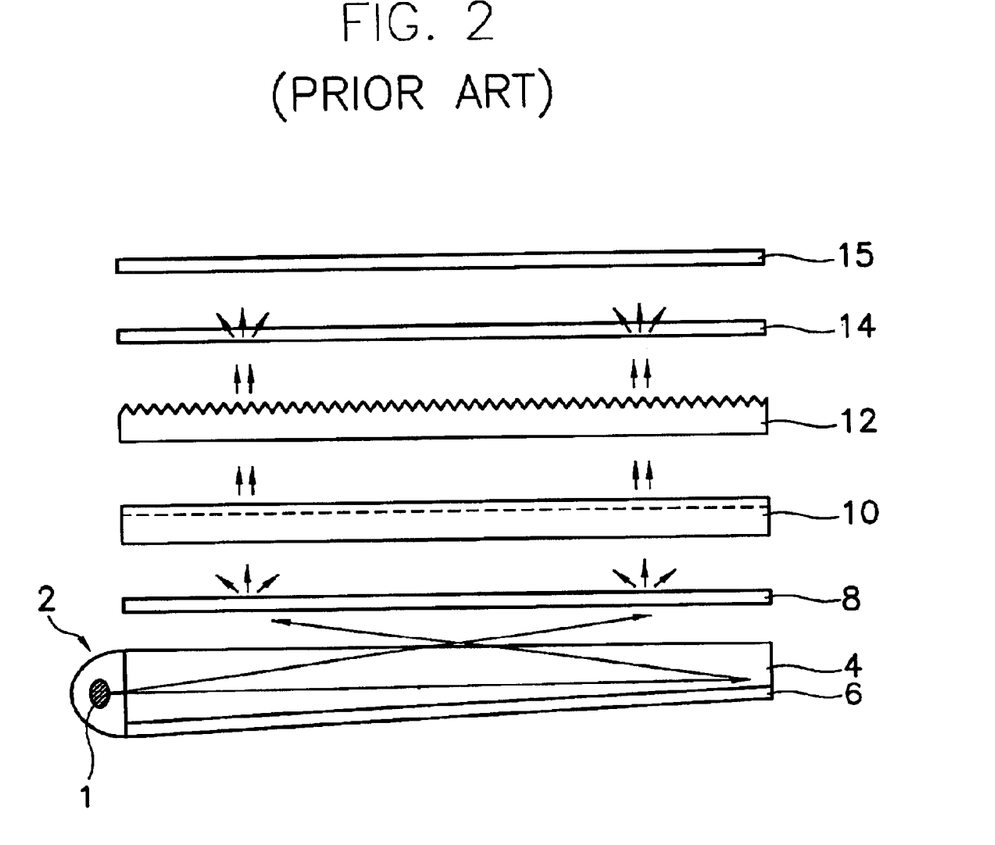
FIG. 2 is a view schematically showing an illuminating path via the back-light assembly of the conventional liquid crystal display device.

FIG. 1 schematically shows the foregoing back-light assembly of the conventional liquid crystal display device. FIG. 2 schematically shows an illuminating process via the back-light assembly of the conventional liquid crystal display device.

Referring to FIGS. 1 and 2, the liquid crystal display device includes a lamp 1 for generating lights, a light guide plate 4 for guiding the lights from the lamp 1, and a lamp housing 2 installed to the side plane of the light guide plate 4 surrounding the lamp 1.

The lamp 1 employs a cold cathode, and the lights generated from the lamp 1 are incident via the side plane of the light guide plate 4.

The lamp housing 2 is formed with a reflection plate 6 on the inner surface thereof to reflect the lights from the lamp 1 toward the side plane of the light guide plate 4, thereby enhancing the efficiency of the lights from the lamp 1.

The light guide plate 4 is formed of a transparent material of plastics such as acrylic resin for forming a panel shape having a sloped lower plane and a horizontal upper plane (alternatively, a sloped upper plane) to allow the lights generated from the lamp 1 to advance toward an LCD panel (not shown) seated on the upper portion after passing through the upper plane of light guide plate 4. Accordingly, the lower plane of light guide plate 4 is formed with various patterns such as a minute dotted pattern printed for changing the advancing direction of the lights from lamp 1 into toward the LCD panel side.

A reflection plate 6 is formed under the lower plane of light guide plate 4, and a diffusion sheet 8, a first prism sheet 10, a second prism sheet 12 and a protecting film 14 are sequentially stacked on the upper plane of light guide plate 4.

The reflection plate 6 again reflects the lights that are not reflected by the minute dotted pattern in the lights which have been generated from the lamp 1 to advance toward the lower plane of the light guide plate 4 toward the upper plane of the light guide plate 4, thereby improving the consistency of the lights transmitted to the upper plane of the light guide plate 4 while decreasing the optical loss of the lights incident to the LCD panel. As described above, the light guide plate 4 and the reflection plate 6 guide the lights generated from the lamp 1 toward the upper plane of the light guide plate 4.

At this time, the lights passing through the upper plane of the light guide plate 4 include the lights outgoing by being to be sloped at various angles as well as the lights outgoing perpendicularly to the upper plane thereof.

The diffusion plate 8 placed between the light guide plate 4 and the first prism sheet 10 scatters the incident lights from the light guide plate 4 to prevent the partial concentration of the lights. Additionally, the diffusion plate 8 decreases the sloped angle of the lights advancing toward the first prism sheet 10 with respect to the first prism sheet 10.

The first prism sheet 10 and the second prism sheet 12 are formed in a manner that triangular bar-shaped prisms are formed to respective upper planes in a regular arrangement, and the prism arrangement of the first prism sheet 10 and that of the second prism sheet 12 are provided to cross each other at a predetermined angle.

The first and second prism sheets 10 and 12 respectively serve for condensing the lights diffused by the diffusion plate 8. By doing so, the vertical incidence with respect to the protecting film 14 of the lights having passed through the first and second prism sheets 10 and 12 becomes most favorable.

For this reason, almost all lights passing through the first and second prism sheets 10 and 12 advance perpendicularly, so that the luminance distribution over the protecting film 14 is uniform.

The protecting film 14 formed on the second prism sheet 12 not only protects the surface of second prism sheet 12 but also diffuses the lights for uniform distribution of lights. The LCD panel 15 is installed on the protecting film 14.

In other words, in the back-light assembly structure of the conventional liquid crystal display device, as shown in FIG. 2, the lights are generated from the lamp to be incident to the LCD panel 15 placed on the protecting film 14 of the back-light assembly via the path provided by the diffusion, condensing, condensing then to diffusion.

However, when applying the illuminating method of the back-light assembly, the above-mentioned conventional liquid crystal display device requires several sheets for condensing/diffusing the lights on/from the upper portion of the light guide plate to therefore complicate the assembling process. Furthermore, the plurality of sheets used for the device may render high probability of puckering to degrade reliability of products and increase the manufacturing cost.

In addition, in the conventional diffusion plate, a plurality of beads are distributed over the front plane and rear plane of the same density to distribute the lights incident from the light guide plate to the rear plane of the diffusion plate.

When constructing the diffusion plate having the aforesaid structure, the precision of condensing function conducted by the first and second prism sheets stacked on the diffusion plate is degraded to lower the front luminance when the lights incident from the lower portion of the diffusion plate are aslant.

Moreover, in the conventional liquid crystal display device, if the protecting film is eliminated to decrease the number of sheets stacked in the back-light assembly, the lights condensed by the first and second prism sheets having the triangularly-shaped section are concentratedly condensed only to the direction that is nearly perpendicular to the plane of the LCD panel to be incident to the LCD panel. The lights condensed as described above cause interference with the pixels of the LCD panel, which in turn incites a moiré phenomenon of producing wave pattern throughout the screen.

SUMMARY OF THE INVENTION

Therefore, one object of the present invention is to provide a method for illuminating in a liquid crystal display device capable of improving front luminance by modulating a lights processing system in a method for illuminating in a liquid crystal display device.

Another object of the present invention is to provide a back-light assembly of a liquid crystal display device and a liquid crystal display device using the same capable of decreasing a manufacturing process and manufacturing a slim and light product by modulating the lights processing in the method for illuminating the liquid crystal display device.

Still another object of the present invention is to provide a back-light assembly of a liquid crystal display device capable of reducing the number of sheets employed therein while preventing a moiré phenomenon.

To achieve the above objects of the present invention, there is provided a method for illuminating in a liquid crystal display device performed by allowing lights generated from a light source to be incident to a light guide plate, and then primarily diffusing the incident lights for a uniformity of the luminous flux distribution. Thereafter, the luminous flux of the primarily diffused lights is primarily condensed with respect to a first orientation component on a plane in parallel with an LCD panel, and the luminous flux of the lights condensed to have the first orientation for extending a view angle of pixels of the LCD panel is secondarily and partially diffused. The luminous flux of the secondarily diffused lights is secondly condensed with respect to a second orientation component that is perpendicular to the first orientation on the parallel plane, and the secondarily condensed lights are illuminated onto the LCD panel.

To achieve the above objects of the present invention, a back-light assembly of a liquid crystal display device includes a light source for generating lights and a light guide plate formed to one side of the light source for allowing the lights generated from the light source to be uniformly incident to an LCD panel side. A first diffusion unit provided to the LCD panel side of the light guide plate is formed to allow the reflectivity of the lights incident from the light guide plate to be higher than the light transmission, so that the incident lights are primarily diffused for uniformly distributing the luminous flux of the incident lights. Also included parts are a first condensing unit provided to the LCD panel side of the first diffusion unit for primarily condensing the luminous flux of the primarily diffused lights with respect to a first orientation component on a plane in parallel with the LCD panel, and a second diffusion unit for partially and secondarily diffusing the luminous flux of the lights condensed to have the first orientation to increase a view angle of pixels of the LCD panel. In addition to these, a second condensing unit secondarily condenses the luminous flux of the lights condensed to have the first orientation with respect to a second orientation perpendicular to the first orientation on the parallel plane.

According to the present invention, the method for illuminating in the liquid crystal display device is improved to make it possible to embody the liquid crystal display device having a high front luminance and reducing the number of sheets which form the back-light assembly of the liquid crystal display device. Therefore, overall thickness and weight of the liquid crystal display device can be decreased.

Further to these, the number of sheets used is reduced to decrease the manufacturing process, which in turn reduces the cost, and the overall quality of back-light assembly to contrive the higher product yield.

BRIEF DESCRIPTION OF THE DRAWINGS

The aforementioned and other objects and advantages of the present invention will become readily apparent with reference to the following detailed description, when considered in conjunction with the accompanying drawings wherein.

DESCRIPTION OF THE PREFERRED EMBODIMENTS

Hereinafter, with reference to the accompanying drawings, a method for illuminating a liquid crystal display device, a back-light assembly and a liquid crystal display device using the method will be described in detail.

Figure 3:
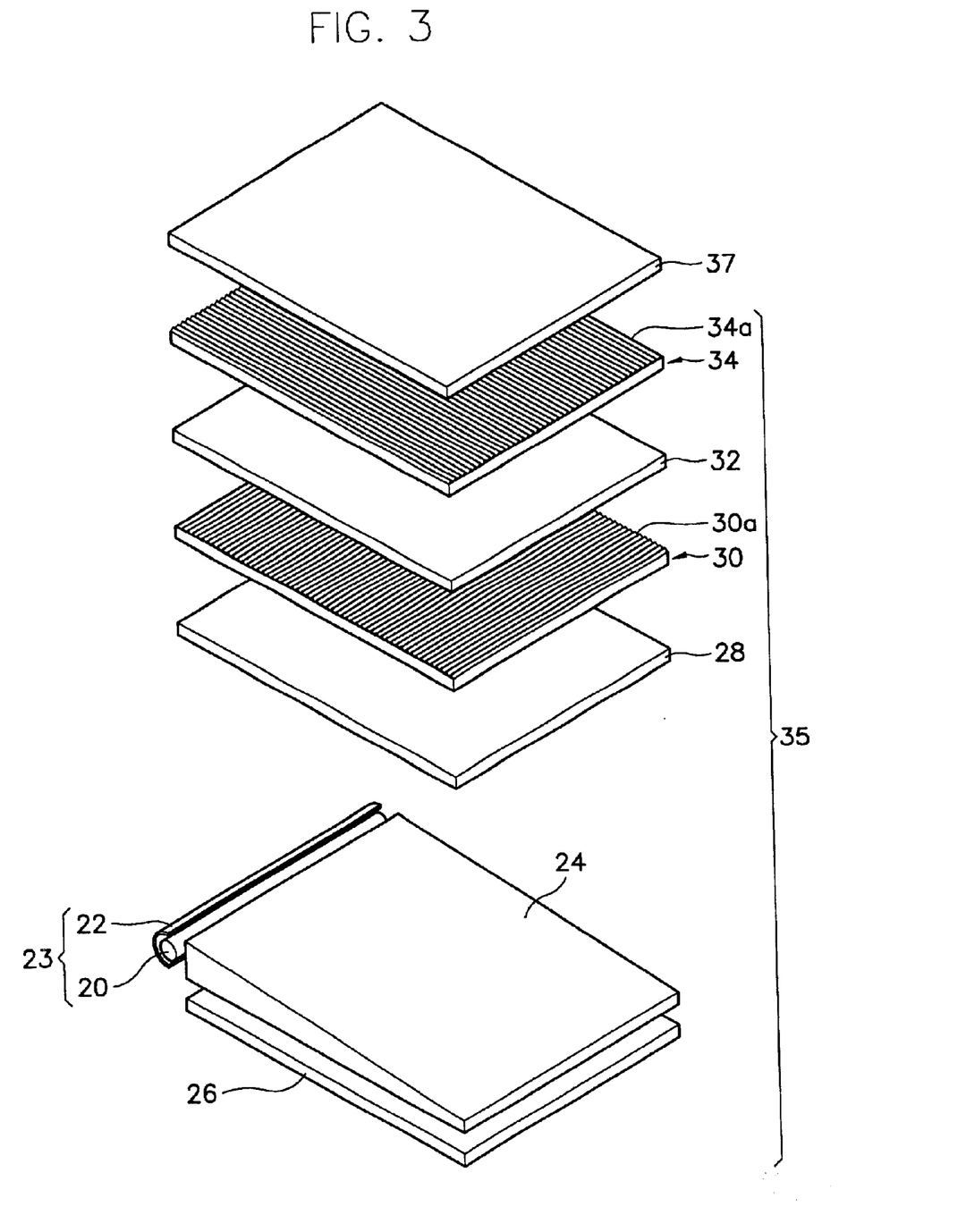
FIG. 3 is a perspective view schematically showing a back-light assembly of a liquid crystal display device according to one embodiment of the present invention.
Figure 4:
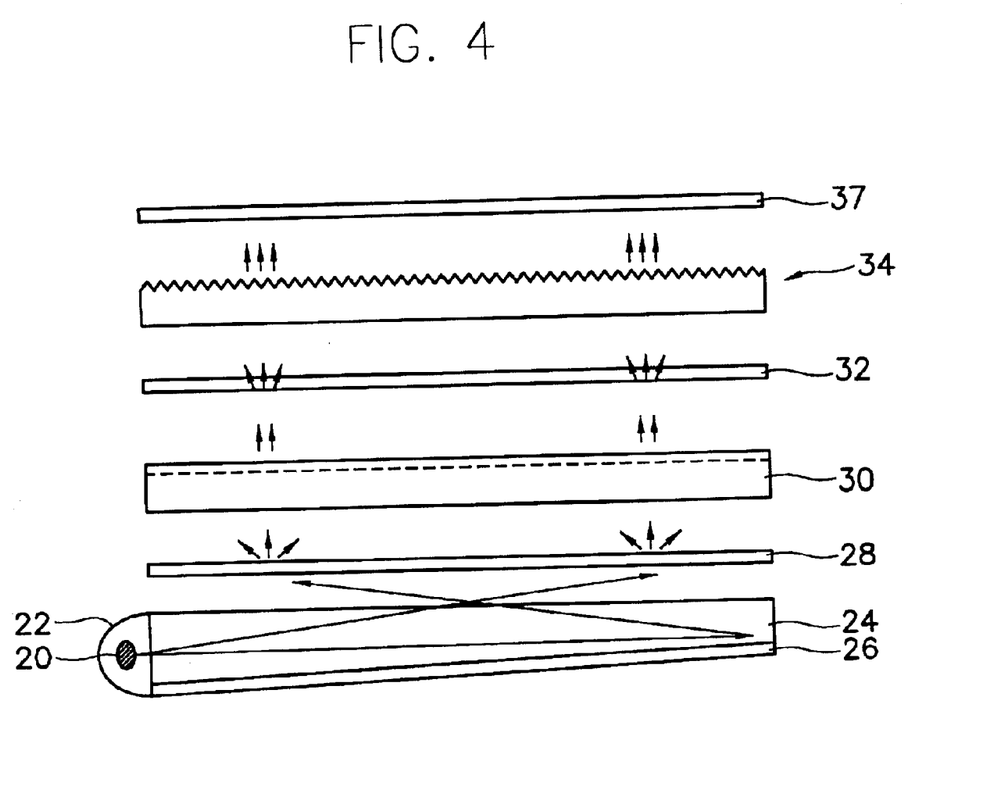
FIG. 4 is a view schematically showing an illuminating process via the back-light assembly of the liquid crystal display device according to one embodiment of the present invention.

FIG. 3 is a view schematically showing a structure of a back-light assembly of the liquid crystal display device according to one embodiment of the present invention. FIG. 4 shows an illuminating path formed by the back-light assembly of the liquid crystal display device according to one embodiment of the present invention.

Referring to FIGS. 3 and 4, the back-light assembly of the liquid crystal display device according to the present invention includes a lamp unit 23 and a light guide unit 35.

The lamp unit 23 includes a lamp 20 for generating lights and a lamp reflection plate 22 for surrounding the lamp 20.

The lamp 20 usually employs a cold cathode, and the lights generated from the lamp 20 is incident to a light guide plate 24 of the light guide unit 35. The lamp reflection plate 22 serves for reflecting the lights generated from the lamp 20 to the light guide plate 24.

The light guide unit 35 is provided with the light guide plate 24 having a reflection plate 26 at its lower surface. A first diffusion sheet 28 is provided onto the light guide plate 24, i.e., onto the LCD panel side of the light guide plate 24. A first condensing sheet 30, a second diffusion sheet 32 and a second condensing sheet 34 are sequentially stacked on the first diffusion sheet 28 in the direction toward a LCD panel 37.

The LCD panel 37 is seated on the upper portion of the light guide unit 35.

The light guide plate 24 is formed of a transparent material of plastic group such as an acrylic so as to form a panel shape having a slanted lower plane and a horizontal upper plane. The light guide plate 24 may be formed to have a wedge shape or a planar shape if the lamp unit 23 is formed to both sides of the light guide plate 24.

The light guide plate 24 is formed with the lamp unit 23 at one side thereof, so that the lights generated from the lamp 20 are incident to the light guide plate 24 to advance to the first diffusion sheet 28 sitting on the light guide plate 24.

The lower plane of the light guide plate 24 may be formed with a variety of patterns such as dotted patterns (not shown) printed for reflecting the lights generated from the lamp to make them incident toward the first diffusion sheet 28 stacked on the upper plane of the light guide plate 24.

The reflection plate 26 is formed to the lower portion of the light guide plate 24, which serves for repeatedly reflecting the lights without being reflected toward the first diffusion sheet 28 by the dotted patterns of the light guide plate 24 to make them incident toward the first diffusion sheet 28.

The lights having reflected by the dotted patterns of the light guide plate 24 and the reflection plate 26 to be incident to the first diffusion sheet 28 advance in a manner to form a prescribed angle range with respect to the horizontal plane of the first diffusion sheet 28.

The first diffusion sheet 28 stacked on light guide plate 24 makes the luminous flux distribution of the lights reflected from the dotted patterns of the light guide plate 24 and the reflection plate 26 consistent. The first diffusion sheet 28 is formed with beads at the plane adjacent to the light guide plate 24 and the plane adjacent to the first condensing sheet 30.

Subsequently, the first condensing sheet 30 is stacked on the first diffusion sheet 28. It condenses the luminous flux of the lights diffused by the first diffusion sheet 28 with respect to a first orientation component on the plane in parallel with the LCD panel 37. In association with the first condensing sheet 30, a plurality of triangular first prisms 30a are arranged on the upper plane of the first condensing sheet 30 in the first orientation. The first prisms 30a condenses the lights with respect to the first orientation component. More specifically, the first prisms 30a are arranged in the X-axis direction on the plane that is perpendicular to the advancing direction of the lights.

A second diffusion sheet 32 is stacked on the first condensing sheet 30. It partially and secondarily diffuses the luminous flux of the condensed lights from the first condensing sheet 30 so as to have the first orientation, thereby extending the view angle of the pixels of the LCD panel 37.

Also, the second diffusion sheet 32 prevents the moiré phenomenon.

That is, if the first condensing sheet 30 and the second condensing sheet 34 are sequentially stacked without the second diffusion sheet 32, the lights condensed by the first and second condensing sheets 30 and 34 having the triangularly-shaped section are incident to the LCD panel 37 by being concentratedly condensed in the direction almost perpendicular to the plane of the LCD panel at the vertex portions of the first and second condensing sheets 30 and 34. The lights condensed in this manner cause interference with the pixels of the LCD panel to produce the moiré phenomenon that involves the wave pattern throughout the screen.

Therefore, the second diffusion sheet 32 that diffuses the perpendicularly condensed lights is stacked on the first condensing sheet 30 to diffuse the lights concentratedly condensed at the vertex portion of the first condensing sheet 30. After this, the lights are condensed by the second condensing sheet 34 in the direction perpendicular to the LCD panel direction to thereby prevent the foregoing moiré phenomenon.

The second condensing sheet 34 is stacked on the second diffusion sheet 32 for condensing the luminous flux of the lights diffused by second diffusion sheet 32 with respect to a second orientation component perpendicular to the first orientation on the horizontal plane.

The second condensing sheet 34 is constructed such that a plurality of triangular second prisms 34a are arranged in parallel with one another on the upper plane of the transparent sheet in a prescribed direction to cross the prism arrangement direction of the first condensing sheet 30 at a predetermined angle. Preferably, the second prisms 34a are arranged in the Y-axis direction that is perpendicular to the X-axis direction on the plane, i.e., perpendicular to the advancing direction of the lights.

Accordingly, the second condensing sheet 34 condenses the luminous flux of the lights secondarily condensed in the second diffusion sheet 32 to have the second orientation that is perpendicular to the first orientation on the parallel plane, and then the finally condensed lights are incident to the LCD panel 37 to improve the front luminance over the conventional one.

At this time, the second diffusion sheet 32 and the second condensing sheet 34 may be formed in a single sheet.

That is, the optical path of the conventional liquid crystal display device is formed from diffusion, condensing, condensing to diffusion. This made it impossible to manufacture a single sheet for performing the diffusion after condensing the lights. However, in the present invention, as shown in FIG. 4, the path of the lights incident to the LCD panel 37 is formed by the path from the diffusion, condensing, diffusion and then condensing to be capable of manufacturing a sheet consisting of a single layer that performs the condensing after the diffusion.

Therefore, in the back-light assembly structure of the liquid crystal display device, the number of sheets stacked on the light guide plate can be reduced from the conventional four-layered structure to the three-layered structure. Thus, the manufacturing process is shortened while minimizing the quality problem of respective sheets, thereby enhancing the manufacturing yield of the liquid crystal display device.

Figure 5:
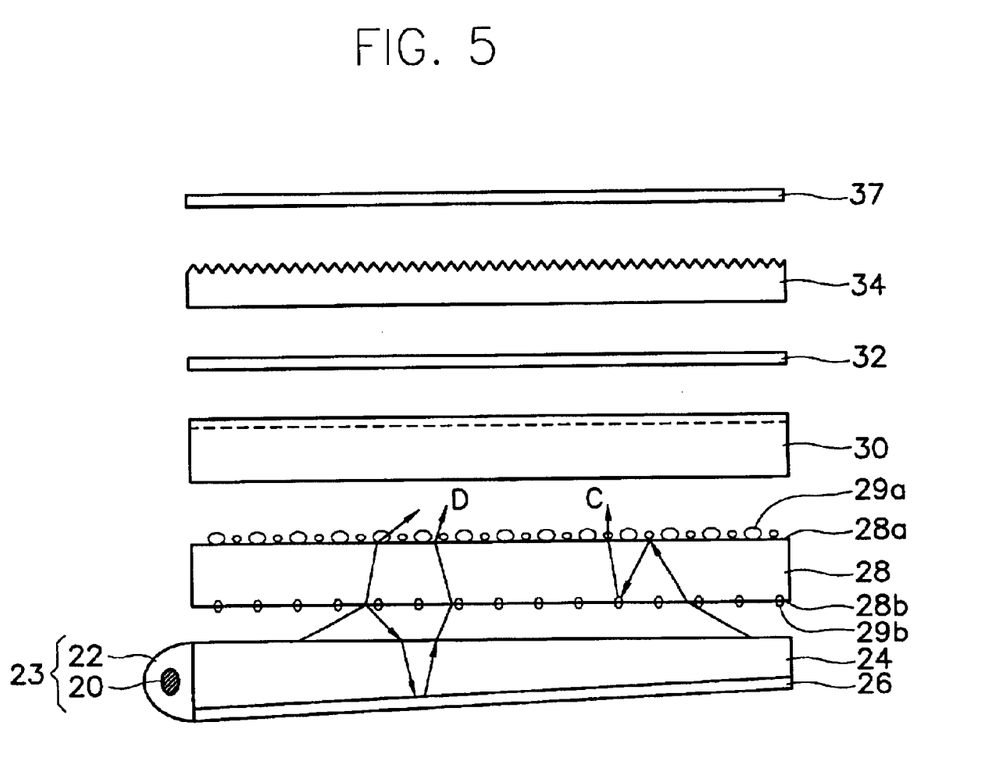
FIG. 5 is a view schematically showing a diffusion sheet formation of the back-light assembly and an illuminating process thereof according to another embodiment of the present invention.
Figure 6:
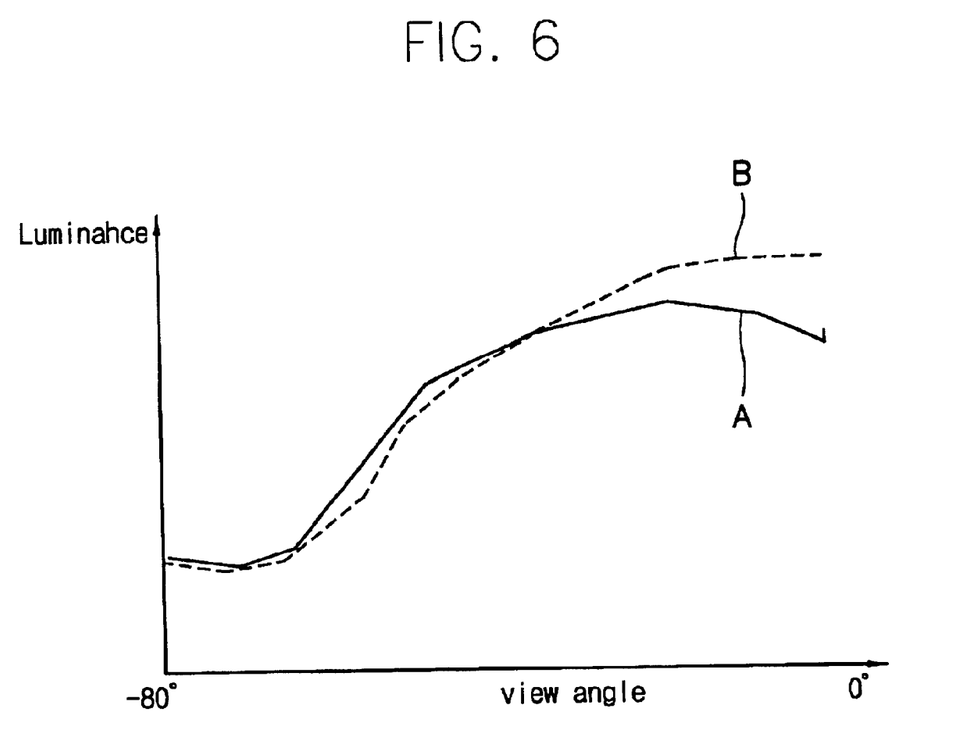
FIG. 6 shows graphs plotting a result of measuring the luminance according to view angles of the diffusion sheet of the conventional liquid crystal display device and of that according to the present invention.

FIG. 5 is a view schematically showing the diffusion sheet formation of the back-light assembly and illuminating process according to another embodiment of the present invention. FIG. 6 is graphs plotting the result of measuring the luminance according to the view angles of the diffusion sheets of the conventional liquid crystal display device and those according to the present invention.

Referring to FIG. 5, the back-light assembly of the liquid crystal display device according to the present invention includes a light guide plate 24 for permitting the lights generated from a lamp 20 to be uniformly incident to an LCD panel side, and a first diffusion sheet 28 stacked to the LCD panel side of the light guide plate 24. Also included as parts are a first condensing sheet 30 provided to the LCD panel side of the light guide plate 24, a second diffusion sheet 32 provided to the LCD panel side of the first condensing sheet 30, and a second condensing sheet 34 provided to the LCD panel side of the second diffusion sheet 32.

A plane 28b of the first diffusion sheet 28 adjacent to the light guide plate 24 and a plane 28a adjacent to the first condensing sheet 30 are respectively formed with beads 29a and 29b. Here, the beads 29a and 29b are distributed to make a haze value of the plane 28b of first diffusion sheet 28 adjacent to the light guide plate 24 higher than that of the plane 28a of the first diffusion sheet 28 adjacent to the first condensing sheet 30.

The haze value represents the degree of diffusive transmission of the incident lights, which is defined as:

In the above equation, the quantity of diffusive transmission denotes the quantity of the diffused lights in the lights that are incident to be transmitted, and the quantity of overall transmission denotes the quantity of the total lights that are incident to be transmitted.

Because the beads 29a and 29b of the first diffusion sheet 28 function for diffusing the lights, the haze value becomes high when the beads 29a and 29b are distributed in the high density, or the haze value is low when being distributed in the low density.

Additionally, in order to differentiate the haze values of the plane 28b of the first diffusion sheet 28 adjacent to the light guide plate 24 and of the plane 28a of the first diffusion sheet 28 adjacent to the first condensing sheet 30, the beads respectively having different refractive indices may be used.

In this way, if the haze value of the plane 28a of the first diffusion sheet 28 adjacent to the first condensing sheet 30 is higher than that of the plane 28b of the first diffusion sheet 28 adjacent to the light guide plate 24, the lights incident aslant from the light guide plate 24 to the first diffusion sheet 28 while having the incidence angle nearly perpendicular to the plane of the first diffusion sheet 28 is diffusively reflected from the plane 28a of the first diffusion sheet 28 adjacent to the first condensing sheet 30 or the plane 28b thereof adjacent to the light guide plate 24.

Among these, the lights reflected from the plane 28a adjacent to the first condensing sheet 30 are, as indicated by the optical path C, subject to a recycle process of being diffusively reflected from the plane 28a of the first diffusion sheet 28 adjacent to the first condensing sheet 30, and then again reflected from the plane 28b adjacent to the light guide plate 24 of the first diffusion sheet 28. While being subject to the recycle process, the lights from the first diffusion sheet 28 toward the first condensing sheet 30 provided to LCD panel side, i.e., the angle changed to have a nearly right angle with respect to the plane of the LCD panel 37, when outgoing from the first diffusion sheet 28 to the first condensing sheet 30.

Furthermore, the lights reflected from the plane 28b of the first diffusion sheet 28 adjacent to the light guide plate 24 are, as denoted by the optical path D, reflected by the reflection plate 26 underlying the light guide plate 24 to be again incident at the angle near to be perpendicular to the plane of the first diffusion sheet 28, thereby outgoing to the first condensing sheet 30 while having the angle with high front luminance.

In other words, conventionally the lights outgoing from the light guide plate are heretofore concentrated much more onto the side rather than the front, so that the condensing rate of the lights in the vertical direction is degraded regardless of being the diffusing and condensing via the diffusion sheet and condensing sheet. For this reason, the high front luminance cannot be obtained.

However, according to the present invention, even if the lights outgoing from the light guide plate 24 is concentrated onto the side to be incident to have the angle almost perpendicular to the plane of the first diffusion sheet 30, the lights are outgoing to the first condensing sheet 30 in the direction nearly perpendicular to the plane of the LCD panel 37 via the recycle process of repeated diffusion and reflection of the lights within the first diffusion sheet 30. It improves the condensing rate at the first condensing sheet 30 and enhances the front luminance of the liquid crystal display device.

The graphs representing the difference of the front luminance resulting from the haze value of the plane 28b of the first diffusion sheet 28 adjacent to the light guide plate 24 and that of the plane 28a of the first diffusion sheet 28 adjacent to the first condensing sheet 30 are plotted in FIG. 6.

In FIG. 6, an alphabet A denotes the result obtained by measuring the front luminance with respect to the back-light assembly of the liquid crystal display device using the conventional diffusion sheet which has the haze value of the plane 28b of the first diffusion sheet 28 adjacent to the light guide plate 24 similar to that of plane 28a of the first diffusion sheet 28 adjacent to the first condensing sheet 30. An alphabet B denotes the result obtained by measuring the front luminance with respect to the back-light assembly of the liquid crystal display device using the diffusion sheet according to the present invention, in which the haze value of the plane 28a of the first diffusion sheet 28 adjacent to the first condensing sheet 30 is higher than that of the plane 28b of the first diffusion sheet 28 adjacent to the light guide plate 24.

As shown in FIG. 6, it can be noted that the liquid crystal display device equipped with the diffusion sheet B using the repeated diffusion and reflection processes according to the present invention has higher front luminance over the conventional diffusion sheet A.

Also, the LCD panel side of the first diffusion sheet 28 is sequentially stacked with the first diffusion sheet 32 and the second condensing sheet 34. Otherwise, the second condensing sheet 34 may be firstly stacked to LCD panel side of the first diffusion sheet 28, and the second diffusion sheet 32 is then stacked to the LCD panel side of the second condensing sheet 34.

At this time, there is a problem of degrading the front luminance due to small quantity of light transmission toward the LCD panel 37 if the haze value of the second diffusion sheet 32 is high. For this fact, the second diffusion sheet 32 has the haze value generally lower than that of the first diffusion sheet 28. Preferably, the light transmission rate at the second diffusion sheet 32 is higher than that at the first diffusion sheet 28 by about 20~30%.

The first diffusion sheet 32 and the second condensing sheet 34 may be formed of a single sheet.

When the second diffusion sheet 32 and the second condensing sheet 34 are constituted by the single sheet as stated above, the foregoing first diffusion sheet 28 according to the present invention having the high front luminance is employed to be able to reduce the number of the sheet used in the back-light assembly of the liquid crystal display device while maintaining the high front luminance.

Figure 7:
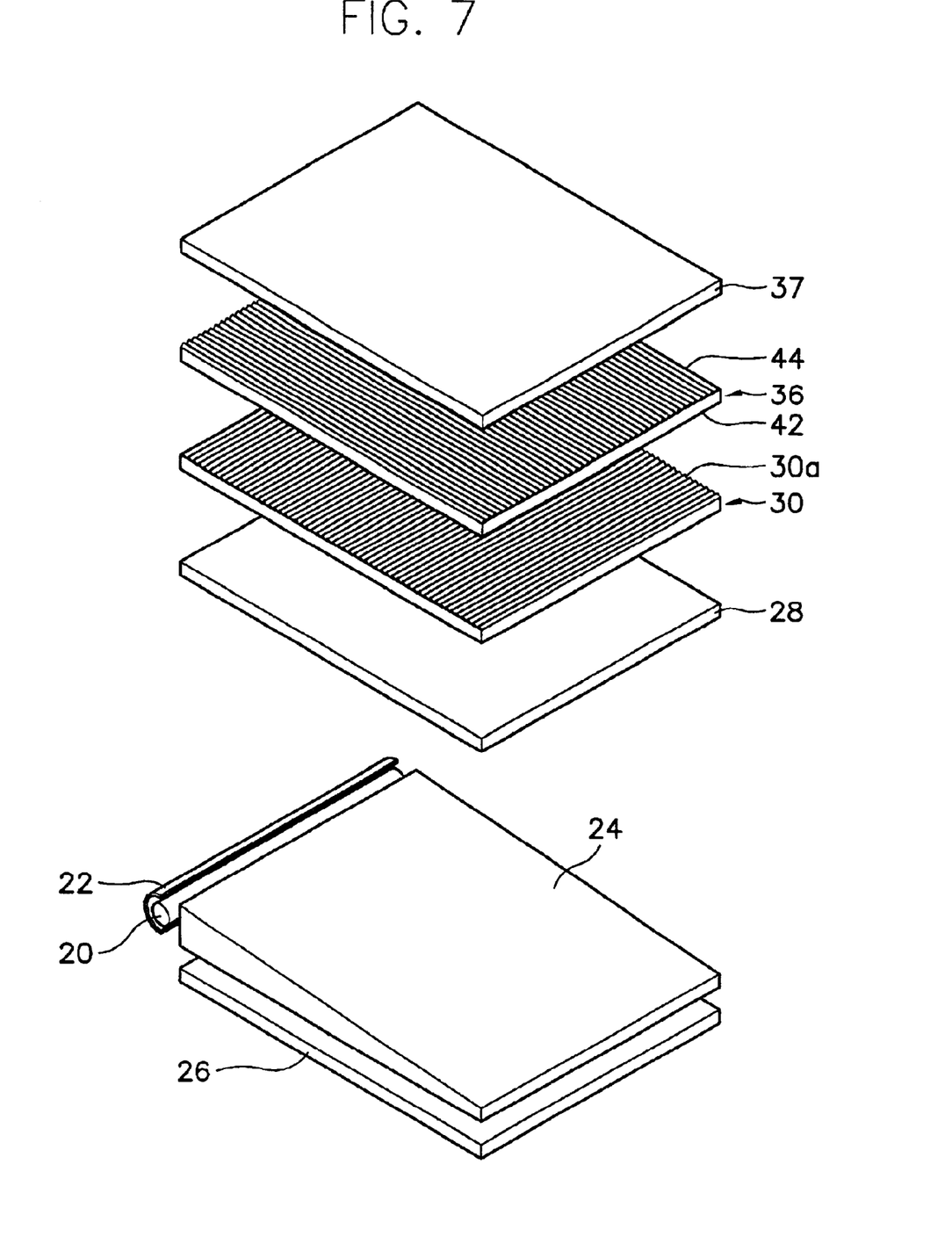
FIG. 7 is a schematic view for illustrating a back-light assembly structure of the liquid crystal display device according to still another embodiment of the present invention.

The structure of the back-light assembly of the liquid crystal display device formed by constituting the aforementioned second diffusion sheet 32 and second condensing sheet 34 in a single sheet is illustrated in FIG. 7.

Hereinafter, the single sheet for performing the diffusion and condensing is referred to as a high luminance condensing sheet 36.

Figure 8:
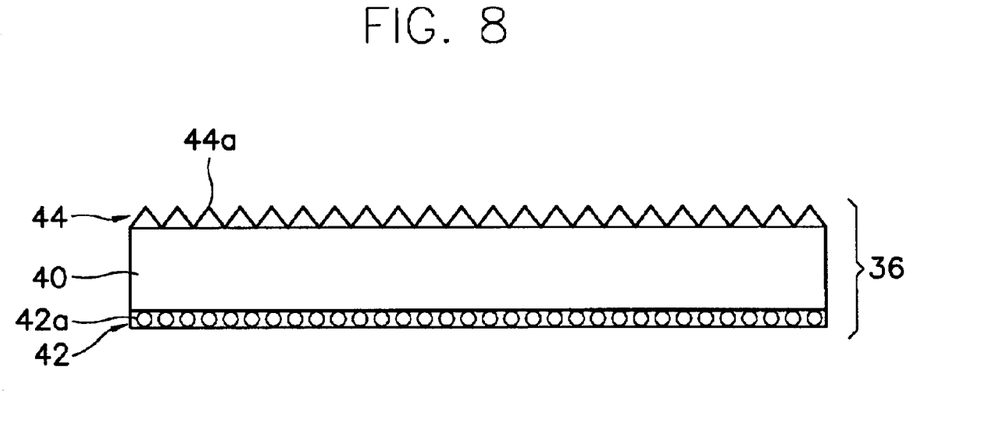
FIG. 8 is a section view for illustrating a high condensing sheet of the liquid crystal display device according to still another embodiment of the present invention.

FIG. 7 is a schematic view for illustrating the structure of the liquid crystal display device according to the present invention. FIG. 8 is a sectional view for illustrating the high luminance condensing sheet of the liquid crystal display device according to the present invention.

Referring to FIGS. 7 and 8, the liquid crystal display device according to the present invention is provided with a lamp 20 and a light guide plate 24 formed to one side of lamp 20. In addition to these, a first diffusion sheet 28, first condensing sheet 30, a high luminance condensing sheet 36 and a LCD panel 37 are sequentially stacked on light guide plate 24.

At the other side of the lamp 20, a lamp reflection plate 22 is formed for reflecting the lights generated from the lamp 20 to the light guide plate 24 while surrounding the lamp 20. A reflection plate 26 is formed to the plane of the light guide plate 24 opposite to the plane formed with the first diffusion sheet 28.

A high luminance condensing sheet 36 is formed by a transparent sheet 40 having a predetermined thickness, a diffusion layer 42 formed at the lower plane of transparent sheet 40, and a condensing layer 44 formed at the upper plane of transparent sheet 40.

The transparent sheet 40 is the main body of high luminance condensing sheet 36, which is formed of polyester.

The diffusion layer 42 is formed by distributing acrylic beads 42a over the polyester resin. The diffusion layer 42 uniformly diffuses the lights primarily condensed by the first condensing sheet 30.

Moreover, the diffusion layer 42 serves for preventing the moiré phenomenon that produces the wave pattern throughout the screen as described above, which has the haze value lower than that of the first diffusion sheet 28.

In the diffusion layer 42, it is preferable that the content of acrylic beads (beads made from acrylic resin) 42a is approximately 10~50 percents by weight with respect to the total amount of the overall diffusion layer.

When the content of the acrylic beads 42a is lower than 10 weight/percent, the diffusion rate is lowered to induce the moiré phenomenon. If the content of the acrylic beads 42a exceeds 50 percents by weight, the front luminance is degraded.

The condensing layer 44 is formed by the second prisms 44a formed of acrylic resin, which are arranged to cross perpendicularly to the arranging direction of the first prisms 30a of the first condensing sheet 30 underlying the high luminance condensing sheet 36.

The condensing layer 44 allows the luminous flux of the secondarily diffused lights from the diffusion layer 42 to have the second orientation perpendicular to the first orientation of the plane in parallel with the LCD panel 37.

Preferably, the thickness of the high luminance condensing sheet 36 is approximately 160 μm, the angle of the vertex of the prism section is approximately 90°, and the interval between respective prisms (distance between the ridgelines of one prism and adjacent prism) is roughly 50 μm.

Except for the high luminance condensing sheet 36, the lamp 20, the lamp reflection plate 22, the first diffusion sheet 28 and the first condensing sheet 30 are formed to have the same structures as those of the above-described embodiments.

Figure 9:
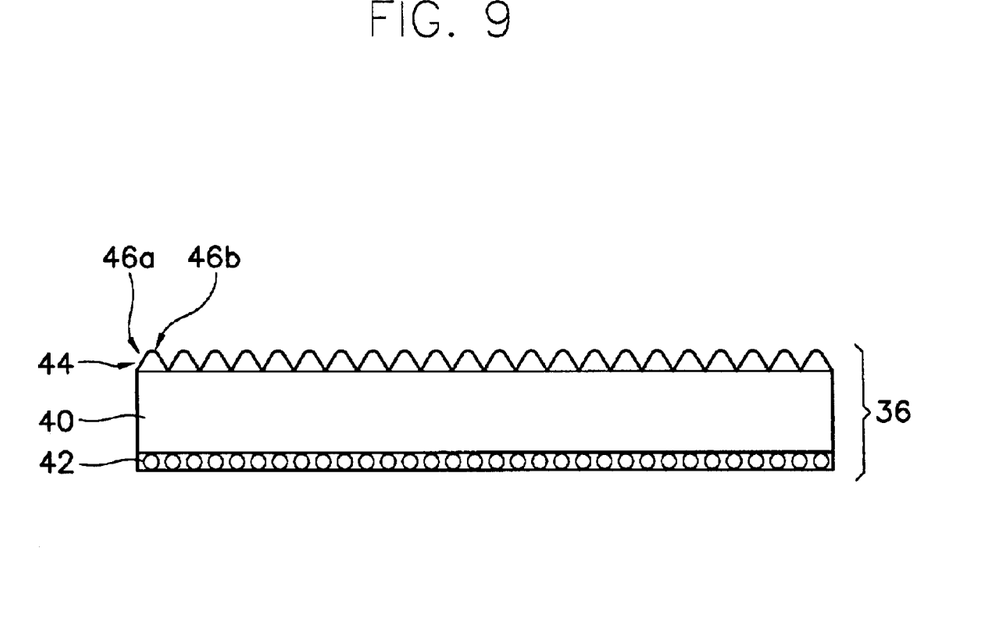
FIG. 9 is a section view for illustrating a high condensing sheet of the liquid crystal display device according to further another embodiment of the present invention.

FIG. 9 is a sectional view for illustrating the high luminance condensing sheet of the liquid crystal display device according to further another embodiment of the present invention Referring to FIG. 9, the vertex portions 46b of the prisms 46a which are the condensing layer 44 of the high luminance condensing sheet 36, i.e., the portions of being seated with the LCD panel 37 among the prisms 46a, may be formed to be round.

Figure 10:
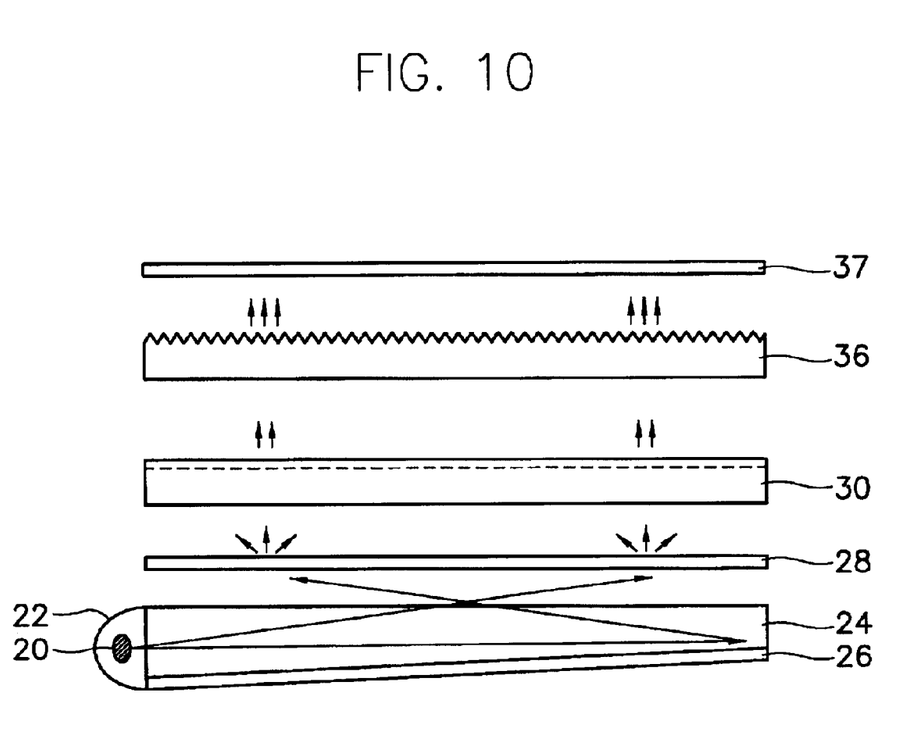
FIG. 10 is a view schematically showing an illuminating path formed by the back-light assembly of the liquid crystal display device according to further another embodiment of the present invention.

The illuminating path via the back-light assembly of the liquid crystal display device according to above-described further another embodiment of the present invention is as shown in FIG. 10.

Referring to FIG. 10, it can be noted that the lights incident to the LCD panel 37 after having passed through the high luminance condensing sheet 36 according to the present invention are condensed to be more perpendicular to the plane of LCD panel 37 than the lights incident to the LCD panel 15 after being diffused from the protecting film 14 in the back-light assembly of the conventional liquid crystal display device as shown in FIG. 2, thereby having the higher front luminance.

The lights diffused and condensed by the high luminance condensing sheet 36 are incident to the LCD panel 37 seated on top of the high luminance condensing sheet 36.

According to the present invention, the path of the lights that have been emitted from the back-light assembly of the liquid crystal display device to be incident to the LCD panel is formed by diffusion, condensing, diffusion then to condensing. Therefore, the condensing rate of the lights incident to the LCD panel is improved to obtain a liquid crystal display device with high front luminance.

At the same time, the layers for performing the diffusion and condensing of the lights are formed by the single sheet, so that the number of the sheets stacked on the light guide plate of the back-light assembly of the liquid crystal display can be decreased from the four-layered structure to the three-layered structure.

By decreasing the number of sheets forming the back-light assembly of the liquid crystal display device as described above, the manufacturing process is reduced and the defect of the back-light assembly caused by the quality problem of the sheet can be minimized. Consequently, the cost is economized and manufacturing yield is remarkably improved. Further to these, overall thickness and weight of the liquid crystal display device can be minimized to easily attain the light weight and slimness of the liquid crystal display device.

Additionally, the diffusion unit is provided between condensing sheets to prevent to the generation of the moiré phenomenon due to the interference of the lights concentratedly condensed only in a certain direction with the pixels of the LCD panel.

Also, the diffusion sheet for regulating the incidence angle of lights of the light guide plate incident from the light guide plate at the LCD panel side to have the high front luminance with respect to the plane of the LCD panel via the repeated diffusive reflection process is provided to improve the front luminance of the liquid crystal display device.

As stated above, preferred embodiments of the present invention are shown and described. Although the preferred embodiments of the present invention have been described, it is understood that the present invention should not be limited to these preferred embodiments but various changes and modifications can be made by one skilled in the art within the spirit and scope of the present invention as hereinafter claimed.

What is claimed is:

1. A method for illuminating in a liquid crystal display device, comprising the steps of:
    allowing lights generated from a light source to be incident to a light guide plate;
    primarily diffusing the incident lights for uniformly distributing a luminous flux;
    primarily condensing the luminous flux of the primarily diffused lights with respect to a first orientation component on a plane substantially parallel with an LCD panel;
    secondarily and partially diffusing the luminous flux of the lights condensed to have the first orientation for extending a view angle of pixels of the LCD panel;
    primarily condensing the luminous flux of the secondarily diffused lights with respect to a second orientation component that is substantially perpendicular to the first orientation on the substantially parallel plane; and
    illuminating the secondarily condensed lights onto the LCD panel.

2. The method of claim 1, wherein the steps of secondarily and partially diffusing the luminous flux and primarily condensing the luminous flux of the secondarily diffused lights are performed by a single sheet.

3. A back-light assembly of a liquid crystal display device, comprising:
    a light source for generating lights;
    a light guide plate formed to one side of said light source for allowing said lights generated from said light source to be uniformly incident to an LCD panel side;
    a first diffuser provided to the LCD panel side of said light guide plate for primarily diffusing the incident lights to uniformly distribute a luminous flux;
    a first condenser provided to the LCD panel side of said first diffuser for primarily condensing the luminous flux of the primarily diffused lights with respect to a first orientation component on a plane substantially-parallel with the LCD panel;
    a second diffuser provided to the LCD panel side of said first condenser for partially and secondarily diffusing the luminous flux of the lights condensed to have the first orientation for enlarging a view angle of pixels of the LCD panel; and
    a second condenser provided to the LCD panel side of said second diffuser for secondarily condensing the luminous flux of the secondarily diffused lights with respect to a second orientation that is perpendicular to the first orientation on the parallel plane.

4. The back-light assembly of claim 3, wherein said second diffuser and said second condenser are formed in a single sheet.

5. A back-light assembly of a liquid crystal display device, comprising:
    a light source for generating lights;
    a light guide plate formed to one side of said light source for allowing said lights generated from said light source to be uniformly incident to an LCD panel side;
    a first diffuser provided to the LCD panel side of said light guide plate for regulating an incidence angle of lights incident from said light guide plate to a direction having a higher front luminance with respect to a plane of the LCD panel with a repeated diffusion reflection processes and for primarily diffusing the lights to uniformly distribute a luminous flux of the incident lights;
    a first condenser provided to the LCD panel side of said first diffuser for primarily condensing the luminous flux of the primarily diffused lights with respect to a first orientation component on a plane in parallel with the LCD panel;
    a second diffuser for partially and secondarily diffusing the luminous flux of the lights condensed to have the first orientation for enlarging a view angle of pixels of the LCD panel; and
    a second condenser for secondarily condensing the luminous flux of the lights condensed to have the first orientation with respect to a second orientation perpendicular to the first orientation on the parallel plane.

6. The back-light assembly of claim 5, wherein said second diffuser is provided to the LCD panel side of said first condenser and said second condenser is provided to the LCD panel side of said second diffuser, thereby condensing the luminous flux of the secondarily diffused lights.

7. The back-light assembly of claim 5, wherein said first diffuser comprises a plurality of beads for allowing a haze value at a plane of said first diffuser adjacent to said first condenser to be higher than that of the haze value at a plane of said first diffuser adjacent to said light guide plate.

8. The back-light assembly of claim 5, wherein said first diffuser comprises a plurality of beads formed to a plane of said first diffuser adjacent to said light guide plate and a plane thereof adjacent to said first condenser and the plurality of beads are distributed to have a higher density at the plane of said first diffuser adjacent to said first condenser than a density at the plane of said first diffuser adjacent to said light guide plate.

9. The back-light assembly of claim 5, wherein a haze value of said second diffuser is lower than that of said first diffuser.

10. The back-light assembly of claim 5, wherein said second condenser is provided to said LCD panel side of said first condenser for secondarily condensing the luminous flux of the primarily condensed lights and said second diffuser is provided to the LCD panel side of said second condenser for diffusing the luminous flux of the secondarily condensed lights.

11. A liquid crystal display device, comprising:
   an LCD panel; and
   a back-light assembly comprising:
      a light source for generating lights;
      a light guide plate for allowing the lights generated from the light source to be incident to the LCD panel side;
      a diffuser provided to the LCD panel side of the light guide plate for primarily diffusing said incident lights to uniformly distribute a luminous flux of said incident lights;
      a condenser provided to the LCD panel side of the diffuser for primarily condensing the luminous flux of the primarily diffused lights with respect to a first orientation component on a plane in parallel with the LCD panel; and
      a high luminance condensing sheet provided to the LCD panel side of the condenser for diffusing and secondarily condensing the luminous flux of said primarily condensed lights.

12. The liquid crystal display device of claim 11, wherein the high luminance condensing sheet comprises:
   a diffusion layer for partially and secondarily diffusing the luminous flux of condensed lights from the condenser for increasing a view angle of pixels of the LCD panel; and
   a condensing layer for secondarily condensing the luminous flux of the secondarily diffused lights from the diffusion layer with respect to a second orientation component perpendicular to the first orientation on the parallel plane.

13. The liquid crystal display device of claim 12, wherein the diffusion layer comprises a plurality of beads formed for uniformly diffusing the lights incident from the condenser.

14. The liquid crystal display device of claim 13, wherein the content of said plurality of beads ranges from about 10~to about 50% of total weight of the diffusion layer.

15. The liquid crystal display device of claim 12, wherein the condenser and the condensing layer are comprised of a plurality of prisms arranged in parallel with one another in a direction for condensing the lights incident from the diffuser and the diffusion layer.

16. The liquid crystal display device of claim 12, wherein the condenser and the condensing layer are formed by arranging prisms to cross one another at a predetermined angle.

17. The liquid crystal display device of claim 12, wherein a vertex portion of prisms of the condensing layer adjacent to said LCD panel are rounded.

* * * * *